United States Patent [19]

Sauer

[11] 4,085,177

[45] Apr. 18, 1978

[54] PROCESS FOR THERMOFORMING A HOLLOW PLASTIC ARTICLE USING AN EXTENDIBLE POROUS MALE MOLD ASSEMBLY

[75] Inventor: Donald G. Sauer, Harwington, Conn.

[73] Assignee: National Can Corporation, Chicago, Ill.

[21] Appl. No.: 583,427

[22] Filed: Jun. 3, 1975

Related U.S. Application Data

[63] Continuation-in-part of Ser. No. 469,404, May 13, 1974.

[51] Int. Cl.$^2$ .................. B29C 17/03; B29C 17/04
[52] U.S. Cl. ............................ 264/89; 264/92; 264/93; 264/292; 425/388
[58] Field of Search .................. 264/89, 90, 92, 93, 264/94, 292, 296; 425/387, 388

[56] References Cited

U.S. PATENT DOCUMENTS

| | | | |
|---|---|---|---|
| 688,924 | 12/1901 | Blair et al. | 264/97 UX |
| 2,442,338 | 6/1948 | Borkland | 264/92 |
| 2,983,955 | 5/1961 | Gajdosik | 264/93 |
| 2,985,915 | 5/1961 | Winstead | 264/292 |
| 3,019,488 | 2/1962 | Doyle et al. | 264/92 |
| 3,337,664 | 8/1967 | Lyon | 264/296 X |
| 3,342,914 | 9/1967 | Edwards | 264/92 X |
| 3,499,188 | 3/1970 | Johnson | 425/398 X |

Primary Examiner—Jan H. Silbaugh
Attorney, Agent, or Firm—Marn & Jangarathis

[57] ABSTRACT

Process for thermoforming hollow articles having large length to diameter ratios. A male mold assembly having an extendible head portion formed of a porous metal is employed with the male mold being passed through the plane of a heated plastic sheet while a vacuum is drawn through the porous metal head portion to draw the sheet against the male mold. The extendible head portion is extended to increase the depth of the formed article.

3 Claims, 4 Drawing Figures

FIG. 3
FIG. 4
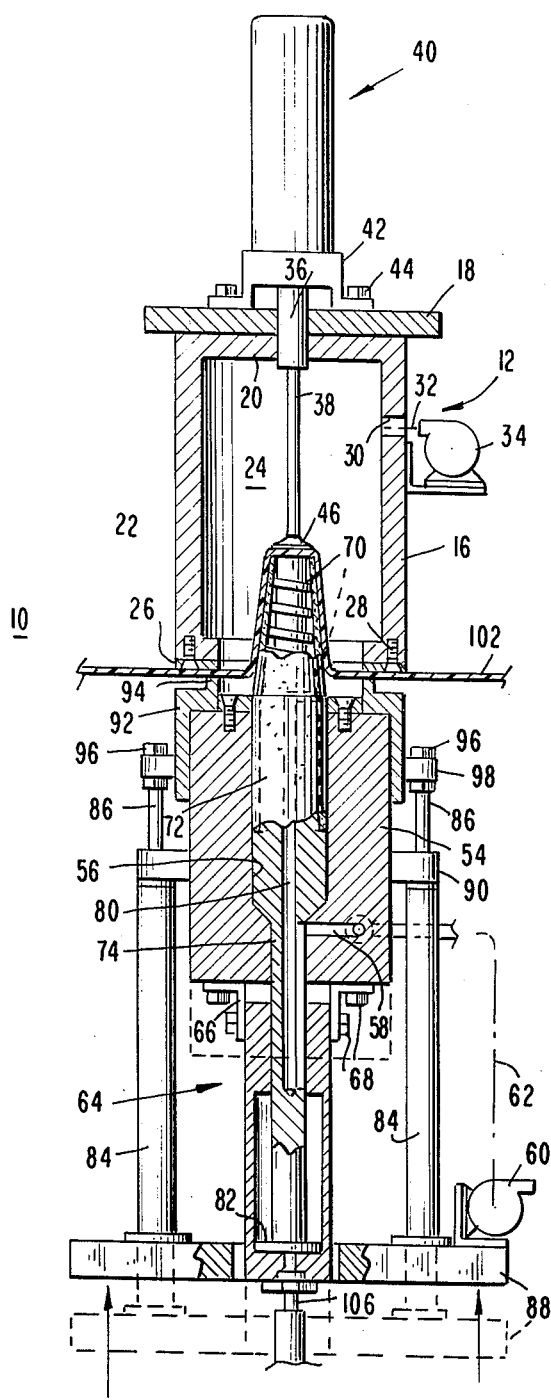
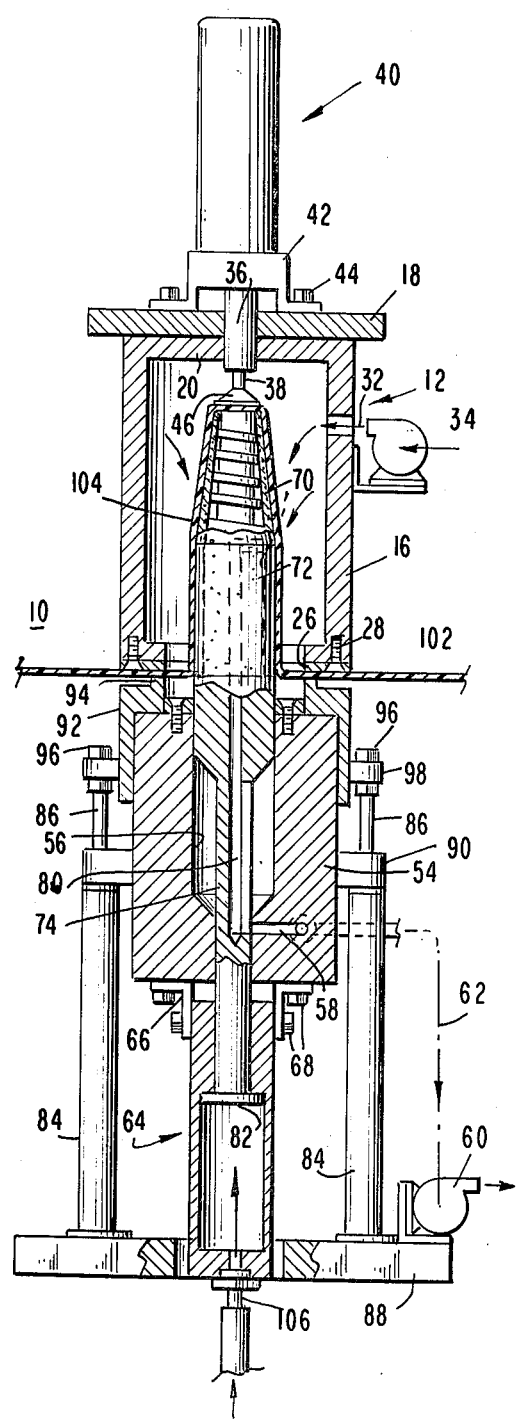

PROCESS FOR THERMOFORMING A HOLLOW PLASTIC ARTICLE USING AN EXTENDIBLE POROUS MALE MOLD ASSEMBLY

This is a continuation-in-part of my copending application Ser. No. 469,404, filed May 13, 1974 and assigned to the same assignee as the present invention.

FIELD OF INVENTION

This invention relates to a process for molding hollow plastic articles from a sheet or strip of thermoplastic material, and more particularly, to a process for the thermoforming of a hollow plastic article utilizing a male mold assembly including a mold member.

BACKGROUND OF THE INVENTION

This invention is particularly concerned with thermoforming operations in which a web or sheet of thermoplastic material is first softened by heat and then formed or shaped while in this stretchable plastic state by being drawn or pressed against the contours of a mold or die under the influence of a fluid pressure differential. The former may be exemplified by the application of pressure within a pressure box produced by compressed air or the like, to press the softened material against the contours of a male mold or core pin. Alternately, a vacuum may be applied from within a female mold while allowing atmospheric pressure to shape the heat softened thermoplastic material against the surface of the female mold. For many purposes, a combination of these two techniques is preferred with the softened sheet material being subjected to vacuum on the face contacting the mold surfaces and to a substantial positive pressure on its other face as such combination provides greater versatility and better control in the forming operation.

Development of the container art has been directed to the use of containers having large capacities, particularly with the ever increasing cost of materials of construction. Present processes for producing tall containers having large length to diameter ratios have almost exclusively utilized extrusion blow molding techniques. In U.S. Pat. No. Re. 28,062 to Scalora, there is disclosed a process for the injection blow molding of a hollow article wherein the parison is extended, preferably in a blow mold prior to expansion of the extended parison to biaxially orientate the plastic material forming the container.

OBJECTS OF THE INVENTION

It is an object of the present invention to provide a novel process for thermoforming hollow plastic articles.

Still another object of the present invention is to provide a novel process for thermoforming hollow articles having large length to diameter ratios.

Another object of the present invention is to provide a novel extendible male mold assembly for a thermoforming process.

Various other objects and advantages of the present invention will become apparent from the following detailed description of an exemplary embodiment thereof with the novel features thereof being particularly pointed out in the appended claims.

SUMMARY OF THE INVENTION

In accordance with one embodiment of the present invention, there is disclosed a male mold assembly having an extendible head portion in part at least formed of a porous metal and including conduit means for effecting the flow of a fluid through the porous metal portion, as more fully hereinafter described.

Another embodiment of the present invention is directed to the use of the hereinabove described male mold assembly in a process for thermoforming hollow articles having large length to diameter ratios. Accordingly, as a male mold of the male mold assembly is caused to pass through the plane of a heated sheet of thermoplastic material, the interior of the male mold is placed in fluid communication with the suction side of a pump to cause the thermoplastic material to form about the male mold to thereby form a wall of more uniform thickness.

BRIEF DESCRIPTION OF THE DRAWINGS

The invention will be more clearly understood by reference to the following detailed description of an exemplary embodiment thereof in conjunction with the accompanying drawings with like reference numerals designated like parts in all figures in which:

FIGS. 2 to 4 are schematic vertical side sections of the thermoforming machine of FIG. 1 sequentially illustrating the formation of a hollow article.

DETAILED DESCRIPTION OF THE INVENTION

It will be appreciated that the type of thermoplastic or thermoelastically deformable material employed in the present process is generally determined by the economics and duty in which the hollow article will eventually be placed. Among the many thermoplastic resins suitable for various purposes and adaptable to thermoforming are high-impact polystyrene, polybutadiene, styrene-butadiene blends or copolymers, polyvinylchloride and related vinyl polymers, polyallomers, nylon, formaldehyde polymers, polyethylene, polypropylene, nitrocellulose, cellulose acetate, cellulose propionate, cellulose acetate, acetate butyrate, polymethylmethacrylate, ethyl cellulose, benzyl cellulose and ethylesters of cellulose.

Figure 1:
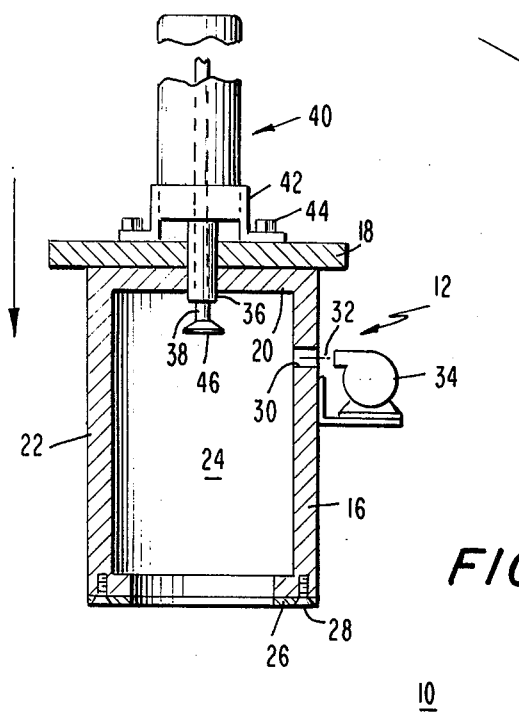
FIG. 1 is a verticle view, partially in section, of a thermoforming molding maching embodying the principles of the present invention with some accessories omitted for greater clarity.
Figure 2:
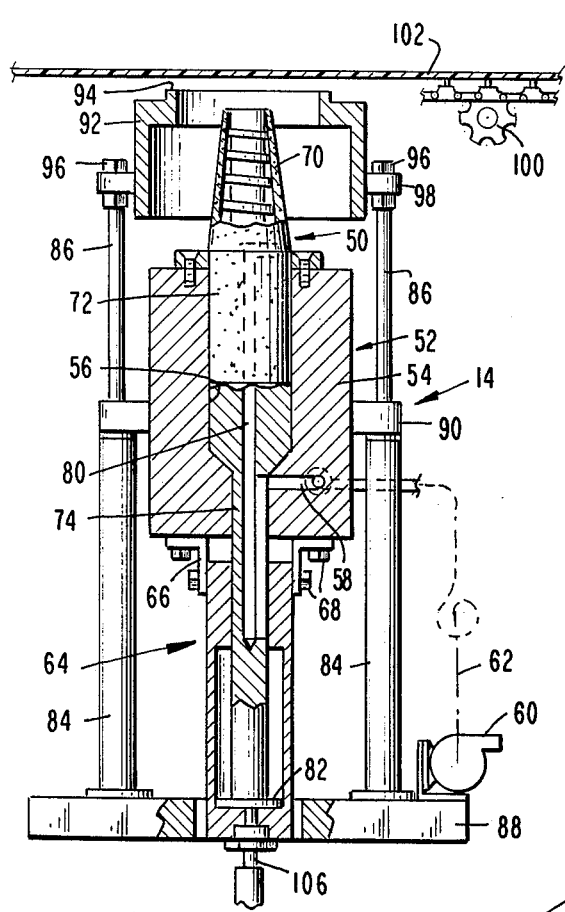
Figure 2:
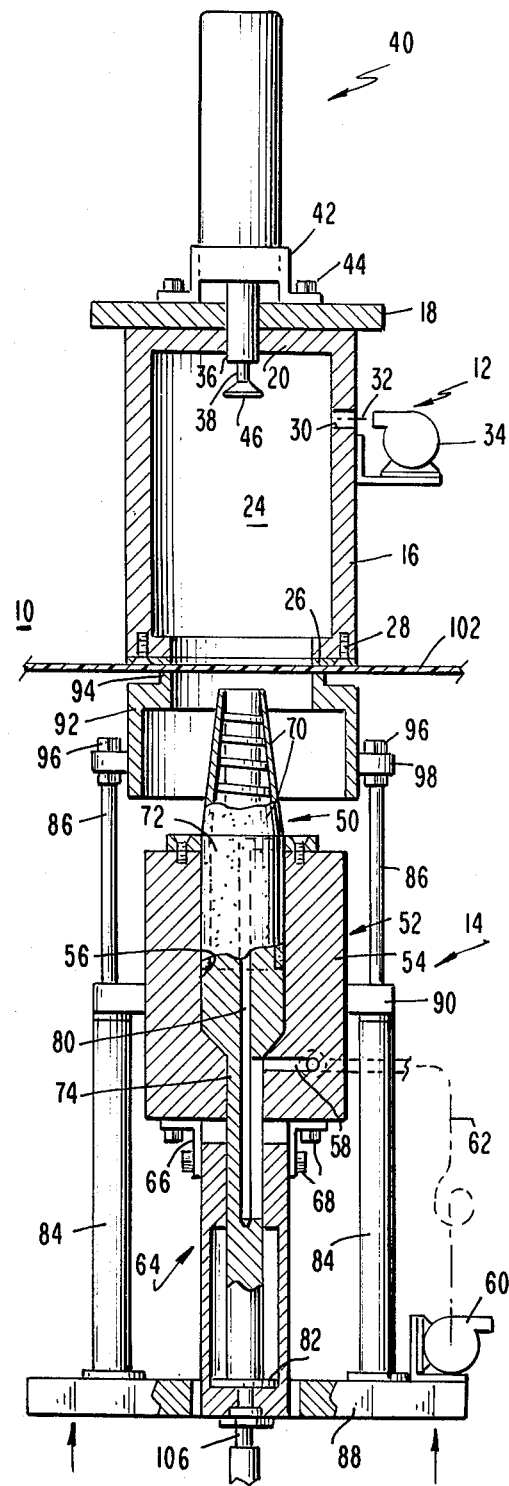

Referring now to FIG. 1, a portion of a molding machine, generally indicated as 10, such as that manufactured by the Brown Machine Co. of Beavertown, Mich., is shown with a pressure box assembly, generally indicated as 12, and a male mold assembly, generally indicated as 14. While the particular disposition of apparatus elements depicted in FIG. 1 does not correspond with any stage of the actual forming cycle, this view illustrates the general construction and arrangement of various parts of the equipment. The pressure box assembly 12 includes a pressure box 16 which is rigidly attached to an upper platen 18 and which may be provided with passages (not shown) to permit the circulation of a heat transfer medium to cool, heat or maintain a constant temperature in the pressure box 16. The upper platen 18 is constructed and arranged for vertical movement in the molding machine by suitable mechanism (not shown).

The pressure box 16 is formed with a top wall 20 and side walls 22 defining a main cavity 24 of the pressure box 16. The pressure box 16 is provided with a clamping plate 26 mounted, such as by screws 28, to the side walls 22 of the pressure box 16. An orifice 30 is provided in a side wall 22 of the pressure box to permit the introduction of a compressed fluid into the cavity 24 of the pressure box 16 by placing such orifice 30 in fluid communication by line 32 with the compression side of a pump, generally indicated as 34. Vertically mounted within the upper platen 18 and top wall 20 of the pressure box 16, there is provided a tubular sleeve 36 for guiding an elongated forming rod 38 of a fluid cylinder assembly, generally indicated as 40. The fluid cylinder assembly 40 is mounted by outwardly extending legs 42 to the upper surface of the platen 18, such as by bolts 44, for the vertical displacement of the elongated forming rod 38. The end of the elongated forming rod 38 extending into the cavity 24 of the pressure box 16 is provided with a conically-shaped support element 46 to minimize, inter alia, the thinning out of that portion of the hollow article being formed, as more fully hereinafter described.

The male mold assembly 14 is comprised of a male mold member, generally indicated as 50, mounted for reciprocating movement within a male mold support assembly, generally indicated as 52. The male mold support assembly 52 is comprised of a base member 54 having a cylindrically-shaped orifice 56 formed therein to receive the male mold member 50 and with an intermediate orifice 58 to provide fluid communication between the male mold member 50 and the suction side of a pump 60 via line 62, as more fully hereinafter described. The base member 54 is provided with a fluid cylinder assembly, generally indicated as 64, mounted to the lower surface of the base member 54 in coaxial alignment with the male mold member 50 by outwardly extending legs 66, such as by bolts 68.

The male mold member 50 is formed with a conically-shaped top portion 70, a cylindrically-shaped intermediate portion 72 and a lower rod portion 74. The top and intermediate portions 70 and 72 are formed of a porous material (i.e., having a multiplicity of discrete passageways formed during fabrication thereof), such as 2 micron stainless steel, such as disclosed in co-pending application Ser. No. 448,191, filed Feb. 4, 1974, now abandoned and assigned to the same assignee as the present invention. The top portion 70 of the male mold member 50 is preferably disposed about an inner support member 76 provided with outwardly extending flat crested arm members 78 and generally formed of a material exhibiting excellent heat transfer properties, such as copper. The intermediate and rod portions 72 and 74 are formed with an orifice 80 to provide fluid communication between the porous metal portions of the male mold 50 and the pump 60, as more fully hereinafter described. It is understood that the inner support member 76 may be formed with a helical thread, such as disclosed in the aforementioned co-pending application.

To an end of the rod portion 74 of the male mold member 50, there is mounted a piston member 82 which is disposed within the fluid cylinder assembly 64 for reciprocal movement of the male mold member 50 during operation of the thermoforming assembly. The male mold assembly 14 is provided with fluid cylinders 84 including piston rods 86 mounted to a lower platen 88. The male mold support assembly 52 is positioned about the upper ends of the fluid cylinders 82, such as by mounting brackets 90 formed on the side walls of the base member 54. A clamp support member 92 including a clamp grid 94 is mounted, such as by bolts 96, to the upper ends of the piston rods 86 by brackets 98 formed on the clamp support member 92.

In FIG. 1 there is also illustrated a feed mechanism, generally indicated as 100, for advancing the thermoplastic web or sheet 102, after being heated to a softened state by suitable means (not shown), such as radiant heaters, infrared lamps, etc. The following description in conjunction with FIGS. 1 to 4 illustrates the sequence of steps in the formation of a hollow article in accordance with the present invention. As is known to those skilled in the art, the pressure box assembly 12, at the beginning of a cycle, is positioned above the thermoplastic sheet a distance sufficient to permit the subsequent unimpeded horizontal passage of the formed article upon advancement of the thermoplastic sheet.

The strip of thermoplastic sheet 102 softened to an optimum forming temperature (i.e., to a stretchable plastic condition) is advanced by the feed mechanism 100 into position between the upper and lower assemblies 12 and 14. The upper platen 18 is caused to be moved downwardly to a point at which the clamp plate 26 is proximate to the sheet 102 with the lower platen 88 being raised to the position shown in FIG. 2 whereby the clamp grid 94 is pressed against the lower surface of the sheet 102, thus trapping the sheet or web of thermoplastic material about the entrance to the cavity 24 of the pressure box 16 between the grid plate 26 and the grid 94. Positive pressure is continuously maintained on the fluid cylinders 86 to retain the grip on the plastic sheet 102 during the forming operation. Simultaneously or subsequent to the trapping of the thermoplastic sheet 102 between the upper and lower assemblies, the elongated forming rod 38 is caused to be moved vertically downwardly by the action of a piston of the fluid cylinder assembly 40 to a point above the thermoplastic sheet 102.

The male mold support assembly 52 is caused to be moved upwardly by the vertical displacement of the lower platen 88 whereby the male mold member 50 is caused to pass through the plane of the thermoplastic material and thence contact the support element 46 of the rod 38 which is controllably biased against the subsequent further upward movement of the male mold support assembly 52 to minimize thinning of that portion of the article being formed. Upward movement of the lower platen 88 is continued until the male mold support assembly 52 is fully positioned within the clamp support member 92, as illustrated in FIG. 3, thereby arresting further upward movement of the male mold support assembly 52. Upward movement of the male mold member 50 is continued by placing the lower chamber of the fluid cylinder 64 on the compression side of a pump (not shown) by line 104 to cause the male mold member 50 to fully extend at a controlled rate into the pressure box 16, as illustrated in FIG. 4. The pressure box 16 may have small negative pressure during extension of the male mold member 50 thereby compensating for volume displacement of the male mold member 50 into the pressure box 16. During upward movement of the male mold through the plane of the thermoplastic material, the interior portion of the male mold member 50 is placed under a negative pressure by causing such interior portion to be placed in fluid communication with the suction side of the pump 60 by orifice 58 via line 62 during stretching of the thermoplastic sheet or film 102 to control wall thickness of the shaped article 104. At full extension of the male mold member 50, a compressed fluid may be introduced into the cavity 24 of the pressure box 16 to assist in the conformation of the thermoplastic material 102 about the contoured surface of the male mold member 50.

The lower male mold assembly 14 is thereafter caused to be moved vertically downwardly to an initial position whereby the formed hollow article 106 may readily be advanced during subsequent advancement of the thermoplastic sheet 102 by the drive means 100 prior to or simultaneously with the upward displacement of the upper assembly 12 to the position illustrated in FIG. 1. The interior portion of the male mold member 50 may be placed on the compression side of the pump 60 to facilitate removal of the hollow article 106 from the contour surface of the male mold member 50.

The feed mechanism 100 is thereafter actuated to move a section of web 102 having the shaped article 106 projecting thereabove out of the machine 10, and to position a fresh section of heated plastic sheet between the assemblies 12 and 14 in preparation for the next molding cycle. The shaped article is trimmed with excess material being usually returned to a shredder or other auxiliary equipment for re-use in the preparation of the thermoplastic sheet. Hollow articles formed in accordance with the present invention may be conveyed to a liner feeder apparatus, such as disclosed in co-pending application U.S. Ser. No. 492,783 filed July 29, 1974, now U.S. Pat. No. 3,999,915, assigned to the same assignee as the present application.

While the invention has been described in connection with an exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivalents thereof.

What is claimed is:

1. In a process for thermoforming a hollow plastic article of uniform thickness over a male mold passed through a plane of a heated sheet of thermoplastic retained between a pressure box assembly including a chamber and a male mold assembly including said male mold and wherein said article is vacuum formed about said male mold, the improvement comprising:

moving said male mold assembly towards said pressure box assembly and continuing such movement whereby said male mold is passed through said plane of said heated sheet of thermoplastic material and into said chamber of said pressure box assembly, said male mold formed in part of a porous metal and having a contoured surface corresponding to said article, said male mold being extendible from said male mold assembly;

placing said male mold in fluid communication with the suction side of a pump means and controlling the pressure within said chamber whereby said thermoplastic material is caused to be drawn about said male mold; and causing said male mold to move further into said chamber of said pressure box assembly by extendible relative movement of said male mold with respect to said male mold assembly while maintaining said male mold in fluid communication with said suction side of said pump and said controlling of the pressure within said chamber, said extendible relative movement being effected to a point beyond further relative movement between said pressure box assembly and said male mold assembly.

2. The process as defined in claim 1 wherein said chamber of said pressure box assembly is placed in fluid communications with the compression side of a pump means during extension of said porous head portion.

3. The process as defined in claim 1 wherein said sheet of thermoplastic material is held between said male mold and a biased member of said pressure box assembly disposed in said chamber thereof during movement of said male mold assembly and continuing through extension of said male mold from said male mold assembly.

* * * * *